(12) United States Patent
Bunker

(10) Patent No.: US 7,072,054 B2
(45) Date of Patent: Jul. 4, 2006

(54) SECURITY OF INCOMPLETE/PENDING JOBS AFTER POWER LOSS

(75) Inventor: Keith G. Bunker, Hilton, NY (US)

(73) Assignee: Xerox Corporation, Stamford, CT (US)

( * ) Notice: Subject to any disclaimer, the term of this patent is extended or adjusted under 35 U.S.C. 154(b) by 786 days.

(21) Appl. No.: 10/320,812

(22) Filed: Dec. 16, 2002

(65) Prior Publication Data

US 2004/0114173 A1 Jun. 17, 2004

(51) Int. Cl.
*G06K 15/00* (2006.01)

(52) U.S. Cl. .................. 358/1.14; 713/340; 714/22; 714/14

(58) Field of Classification Search .............. None
See application file for complete search history.

(56) References Cited

U.S. PATENT DOCUMENTS

| | | | |
|---|---|---|---|
| 5,791,790 A * | 8/1998 | Bender et al. | 400/61 |
| 5,832,331 A * | 11/1998 | Yoshida et al. | 399/43 |
| 6,487,521 B1 * | 11/2002 | Carney | 702/186 |
| 6,545,774 B1 * | 4/2003 | Park | 358/441 |
| 6,941,479 B1 * | 9/2005 | Sugiura | 713/300 |
| 2003/0226464 A1 * | 12/2003 | Mathieson | 101/484 |
| 2003/0227642 A1 * | 12/2003 | Anderson et al. | 358/1.13 |
| 2004/0169880 A1 * | 9/2004 | Nakanishi et al. | 358/1.15 |

* cited by examiner

*Primary Examiner*—Mark Zimmerman
*Assistant Examiner*—Vincent M. Rudolph
(74) *Attorney, Agent, or Firm*—Fay, Sharpe, Fagan, Minnich & McKee, LLP

(57) ABSTRACT

An apparatus and method for erasing incomplete and/or pending jobs from a marking device's non-volatile memory after a power loss. A threshold power loss duration can be selected, as can type of job(s) to be erased and whether users should be notified of erasure.

25 Claims, 10 Drawing Sheets

SECURITY OF INCOMPLETE/PENDING JOBS AFTER POWER LOSS

CROSS-REFERENCE TO RELATED APPLICATIONS

This application is related to U.S. patent application Ser. No. 09/871,877, filed Jun. 4, 2001 by Bunker, et al., entitled SECURE DATA FILE ERASURE.

FIELD OF THE INVENTION

The invention relates to data security, particularly in marking devices, such as photocopiers, fax machines, and printers.

BACKGROUND AND SUMMARY

Many photocopiers, printers, and other reproduction and printing devices now include non-volatile memory (NVM), such as magnetic and optical storage media and including removable disk systems, hard drives, and other storage media systems allowing the device and/or a user to store a job the device uses or is directed to use the stored job. In high security areas (e.g., military installations), there is often a requirement that all jobs that stored on NVM of a device shall be inaccessible once the job is completed. Additionally, users in lower security area often wish to erase data they would like to keep private or confidential for various reasons.

A risk to security arises when a printing device loses power while printing, processing, or storing incomplete pending jobs in a queue. When the device regains power, it will typically check for incomplete and/or pending jobs and print them. If the loss of power lasts too long, the user may leave the vicinity of the printing device and the output of the device can remain in an output tray for a long time, possibly forgotten by the user who sent the job or simply languishing because the user has gone home for the day.

Embodiments address this problem by introducing a method and apparatus that checks the duration of the power loss against a reference duration and erasing any pending and/or incomplete jobs when power is restored, rather than printing the jobs and leaving them vulnerable. Notices can be sent to the users who sent the job(s) so that they know what happened to the jobs. The duration can be checked by using a chronometer, accessing an on-board clock of the device, checking a device log, or a combination or two or more of these. The reference duration can be preprogrammed or user defined. Preferably, the erasure is accomplished using a secure erase routine.

Lately, secure erase systems that overwrite the data with patterns of 1s, 0s, or random combinations thereof have come into use to meet erasure requirements. However, government agencies and other customers have different requirements as to how many times one can overwrite the appropriate portions of NVM once a job or task is completed, which can lead to difficulties in product design and implementation.

Embodiments of the invention allow a user or a system administrator (SA) to program a device to overwrite the region of NVM in which the data file associated with a print, scan, fax, copy, or other job resides. In embodiments, the data file is overwritten more than once, such as from 2 to about 50 times, with the exact number of overwrites being determined according to a stored default value or a user-input value. Further, in embodiments, the data file can be overwritten with a different pattern on each overwrite according to a stored default value or a user-input value. For example, if a user has just printed something stored on a floppy disk, the user can erase it securely with a sequence of patterns of choice. Instead of trying to settle on a single algorithm (e.g., overwrite 3 times, first time with 1s, the second time with 0s, the third time with a random pattern), this allows overwriting "n" times with a set of patterns that can be downloaded to the device.

Embodiments activate an erase trigger automatically, which places the digital copier or printer into, for example, an Image Disk Erasing Routine, where an Image Disk is a storage media used by the device to store data files including scanned images of documents and/or print job data and the like. An example of such an Erasing Routine is a routine that executes three complete erasures with a check to ensure the data is completely erased; per industry or security approved processes. The Erasing Routine removes or destroys any residual data files including documents, images, and the like, on the Image or ESS Disks. In embodiments, a customer selectable UI/client button with confirmation that the process was completed could activate this routine. During this erasing feature, the system would be offline.

Thus, a feature of the invention provides a storage medium security erase system comprising an erase trigger that tells a drive sector analyzer to retrieve data file location information from a CPU and send the location information to a secure storage medium eraser that overwrites the data file according to a predetermined secure erase method, the eraser using a type of overwrite pattern and a number of overwrites determined by an erase pattern determiner according to predetermined criteria and/or user input.

An additional feature of the invention is to apply a method of securely erasing a data file by a providing an erase trigger, determining a location of the data file on the storage medium, overwriting the data file according to a predetermined secure erase method, and determining at least a number of times to overwrite the data file in response to the erase trigger and according to predetermined criteria.

Advantageously, embodiments determine how long a power loss has lasted and invoke an erase routine, such as a secure erase routine, when the power loss exceeds a threshold duration.

DESCRIPTION

Figure 1:
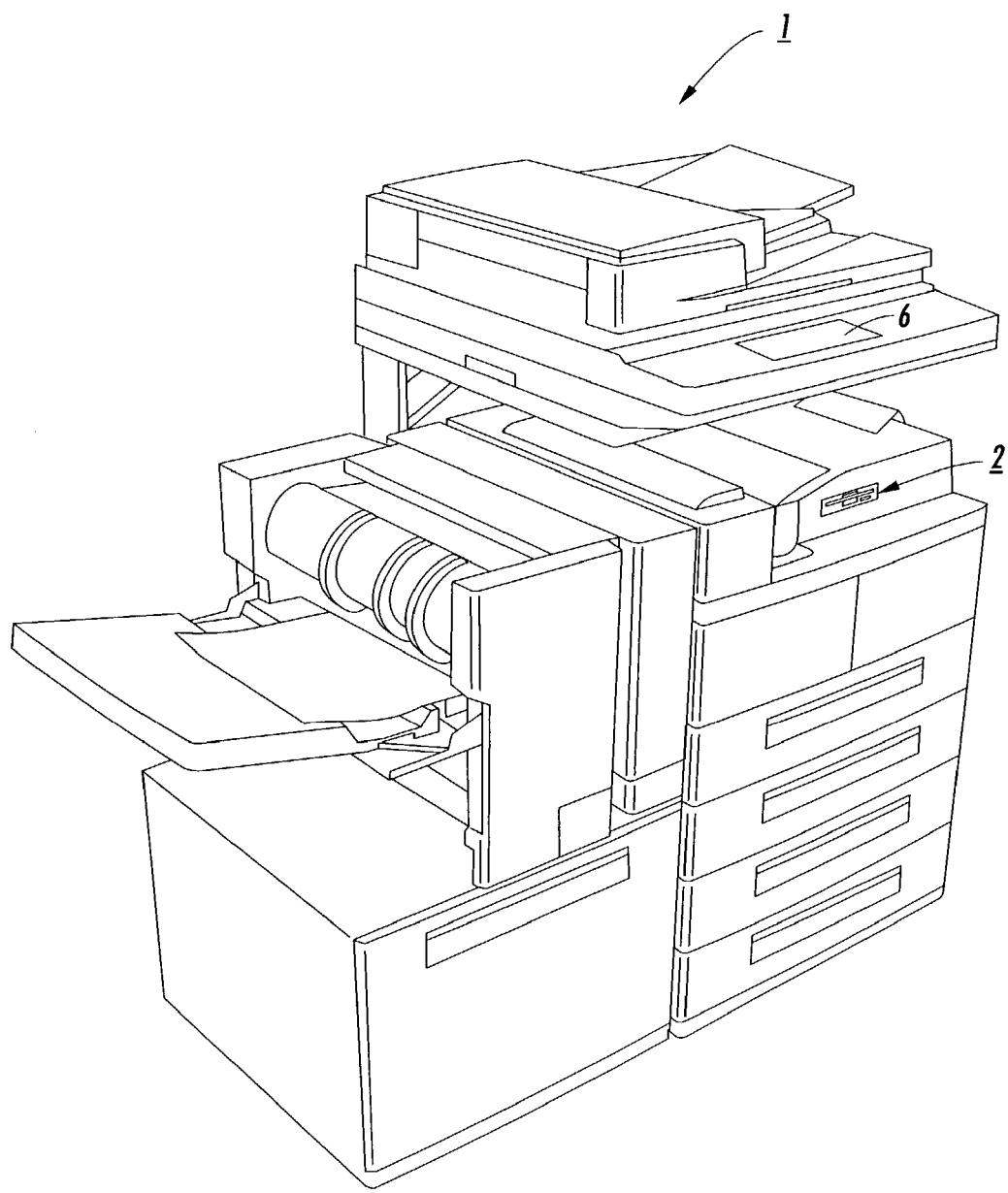
FIG. 1 is a perspective view of a digital printing and/or reproducing device that can use embodiments of the invention.
Figure 2:
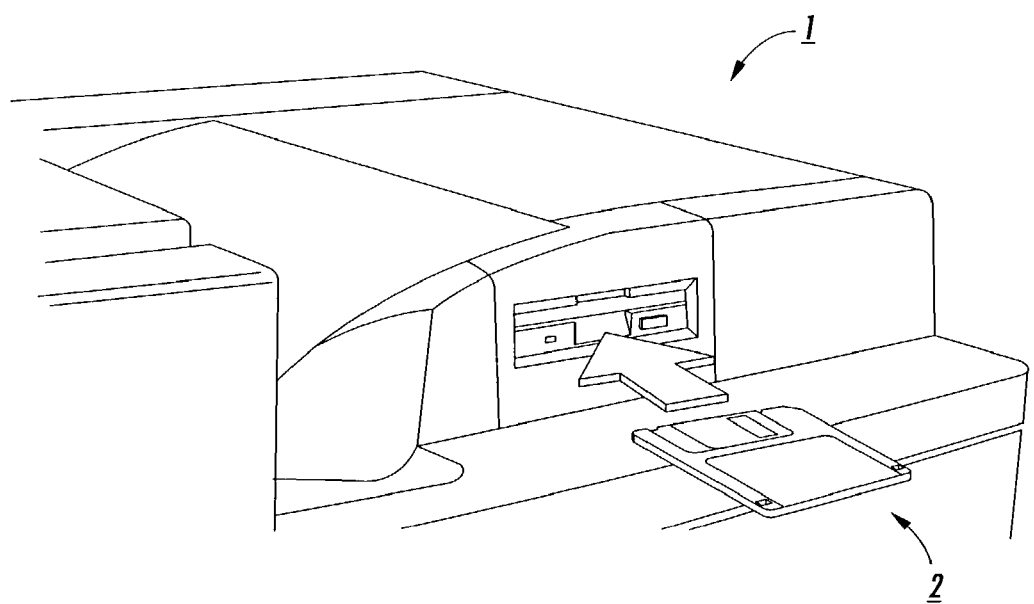
FIG. 2 is a close-up perspective view of a removable storage media drive of the device shown in FIG. 1.

For a general understanding of the present invention, reference is made to the drawings. In the drawings, like reference numerals have been used throughout to designate identical elements.

With reference to the accompanying FIGS., various embodiments of the invention include a device 1, such as a scanner, printer, photocopier, or other device, having a non-volatile memory (NVM) 2, such as a magnetic or optical storage medium, to which the device 1 can store data 3 and/or from which the device can read data 3 stored in a data file 4. The NVM can be a relatively permanently installed hard disk drive, or can be a drive that employs removable media; multiple drives can be used as NVM in embodiments employing combinations of hard disk drives, removable drives, and other NVM. In embodiments, the device 1 can use the data 3 to produce output, such as paper hard copy of a word processing document or the like. When a device 1 experiences a power loss, it will typically check for pending jobs on the NVM 2 when power returns, then complete any incomplete pending jobs.

Figure 3A:
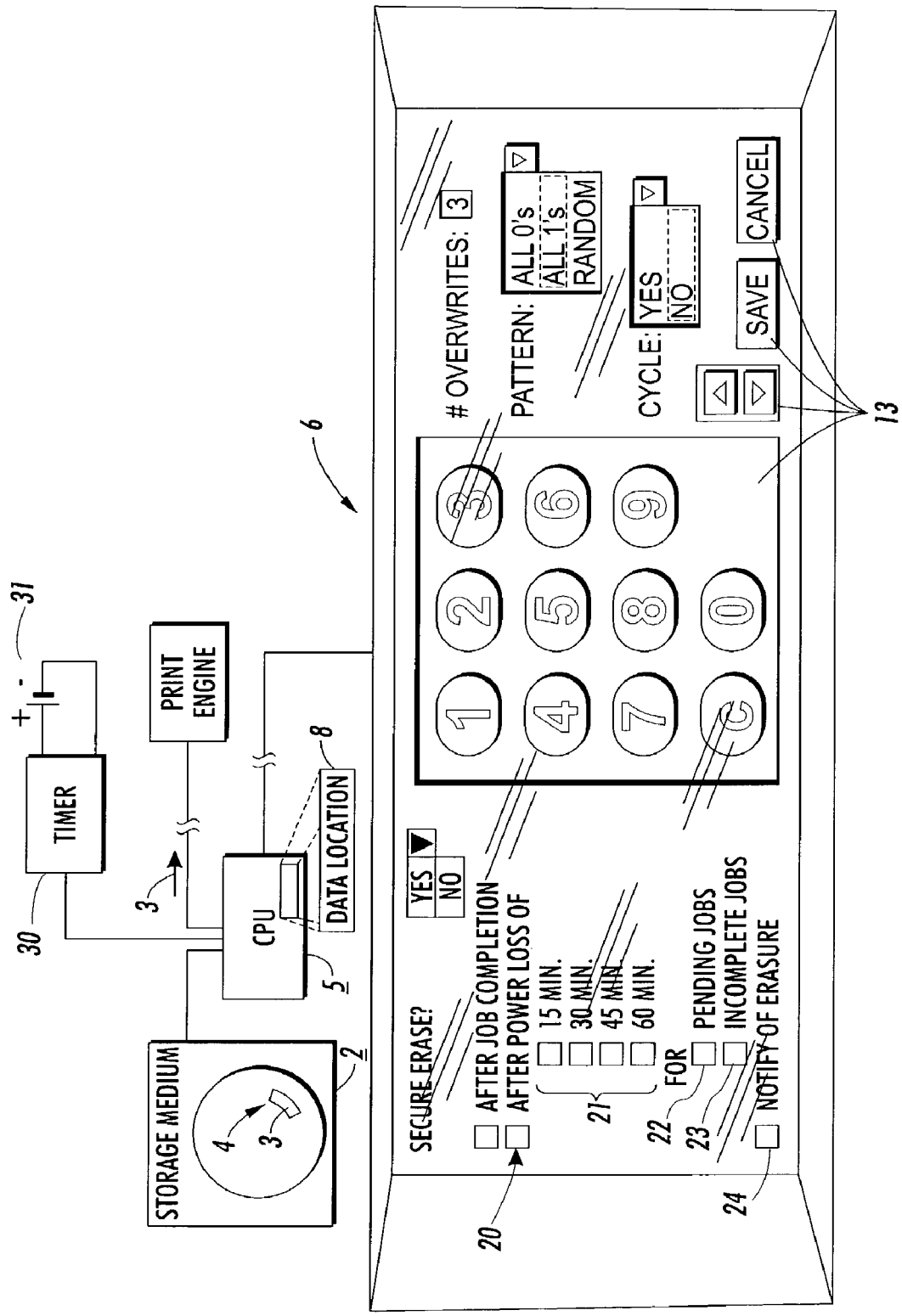
FIGS. 3A, 3B, and 3C are elevational views of a display panel of the device of FIG. 1 showing a graphical user interface in which a user can select parameters according to embodiments.
Figure 3B:
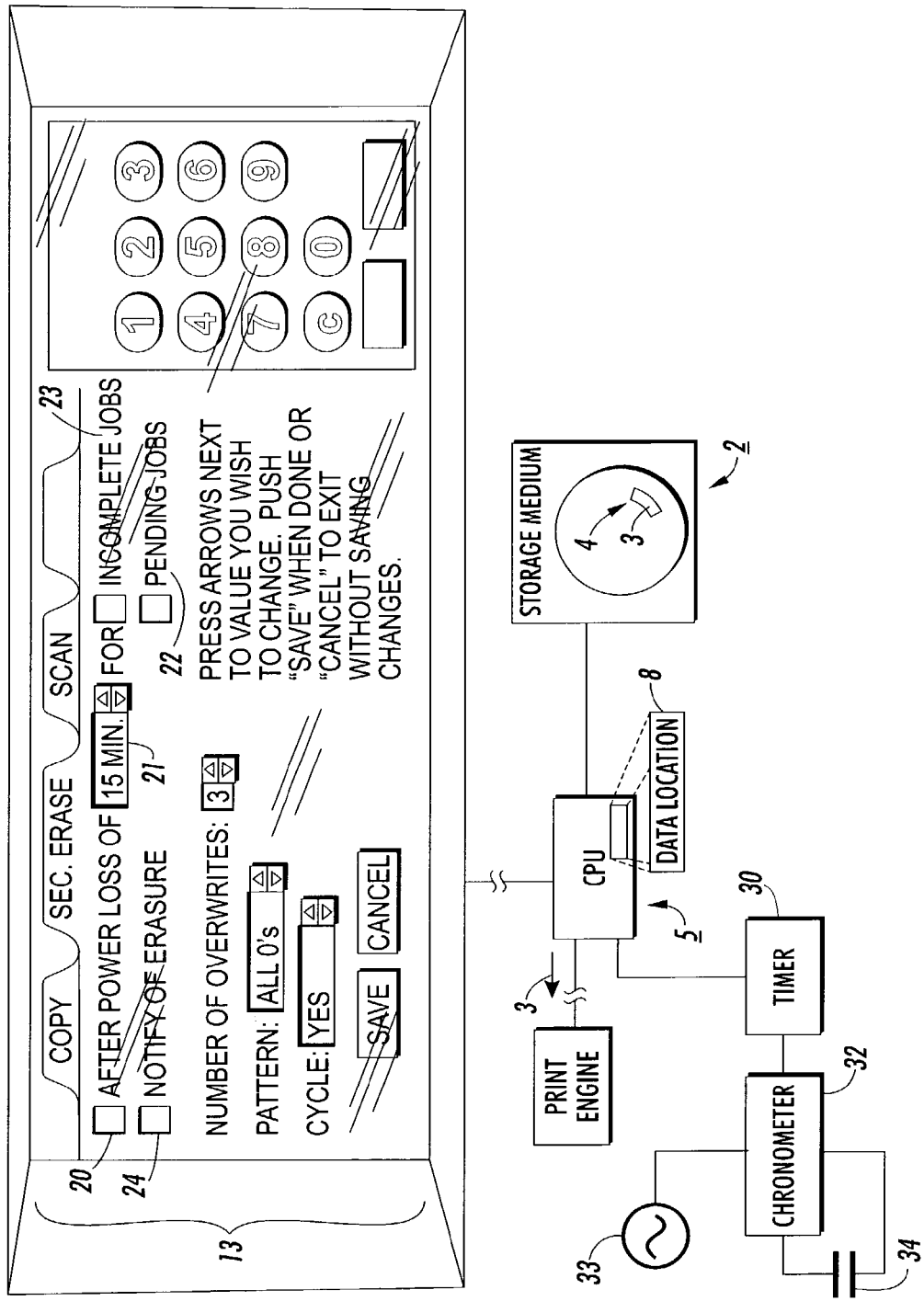
Figure 3C:
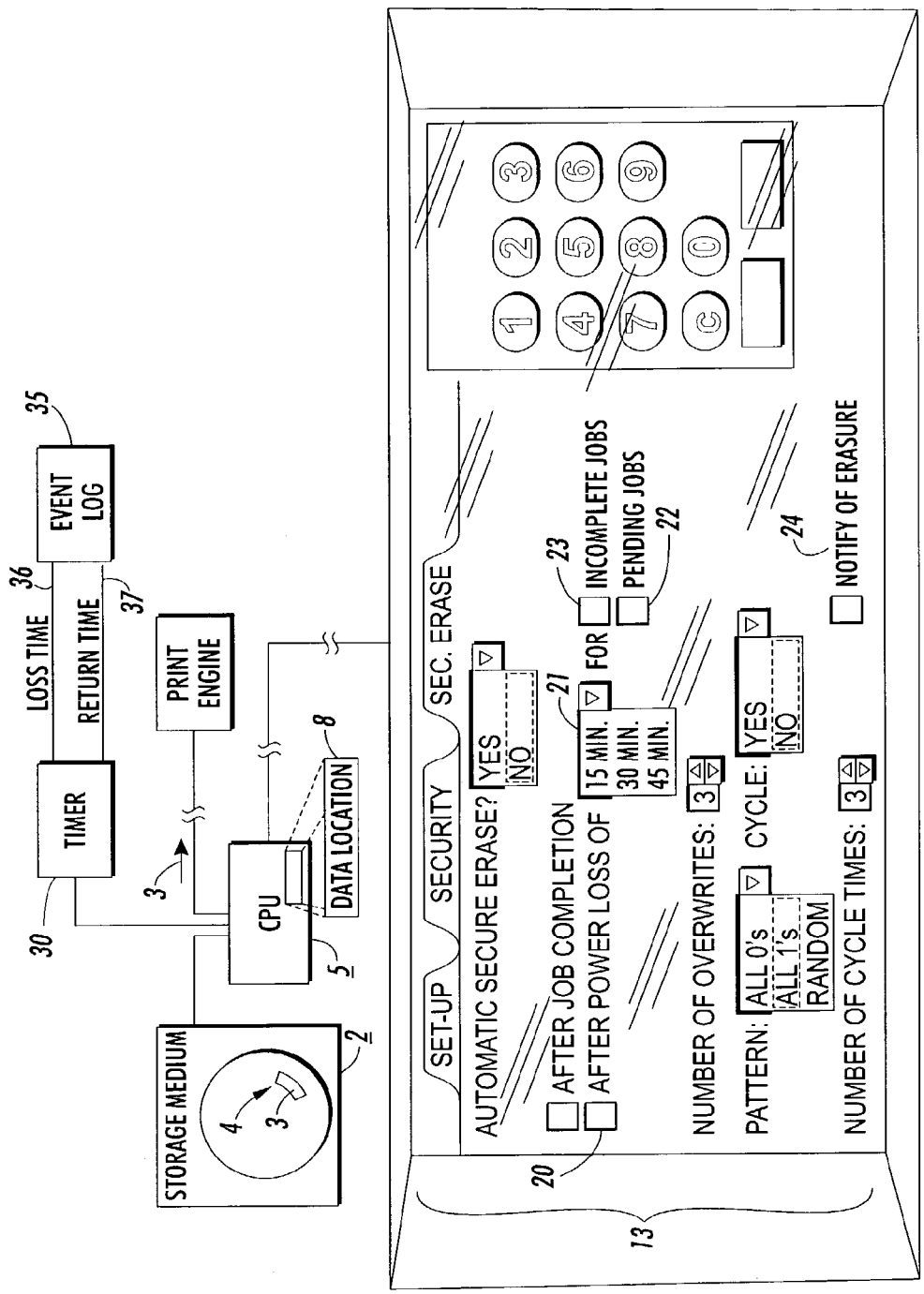
Figure 5:
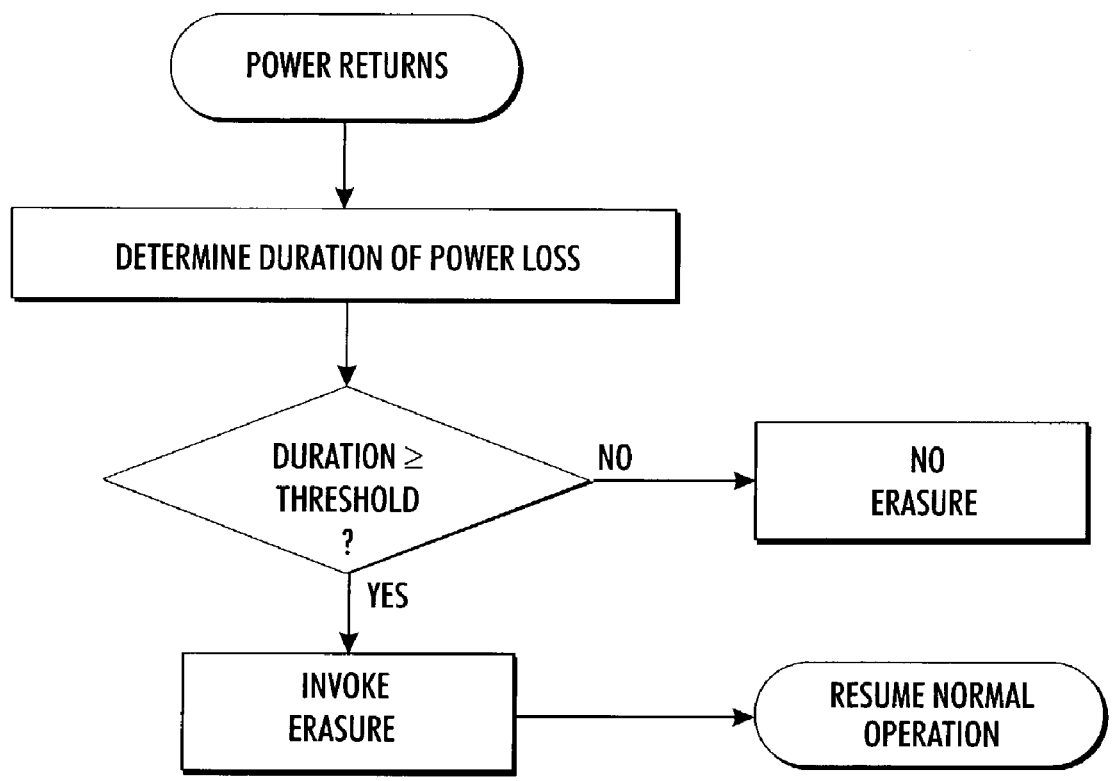
FIG. 5 is a schematic diagram illustrating a method according to embodiments.
Figure 6:
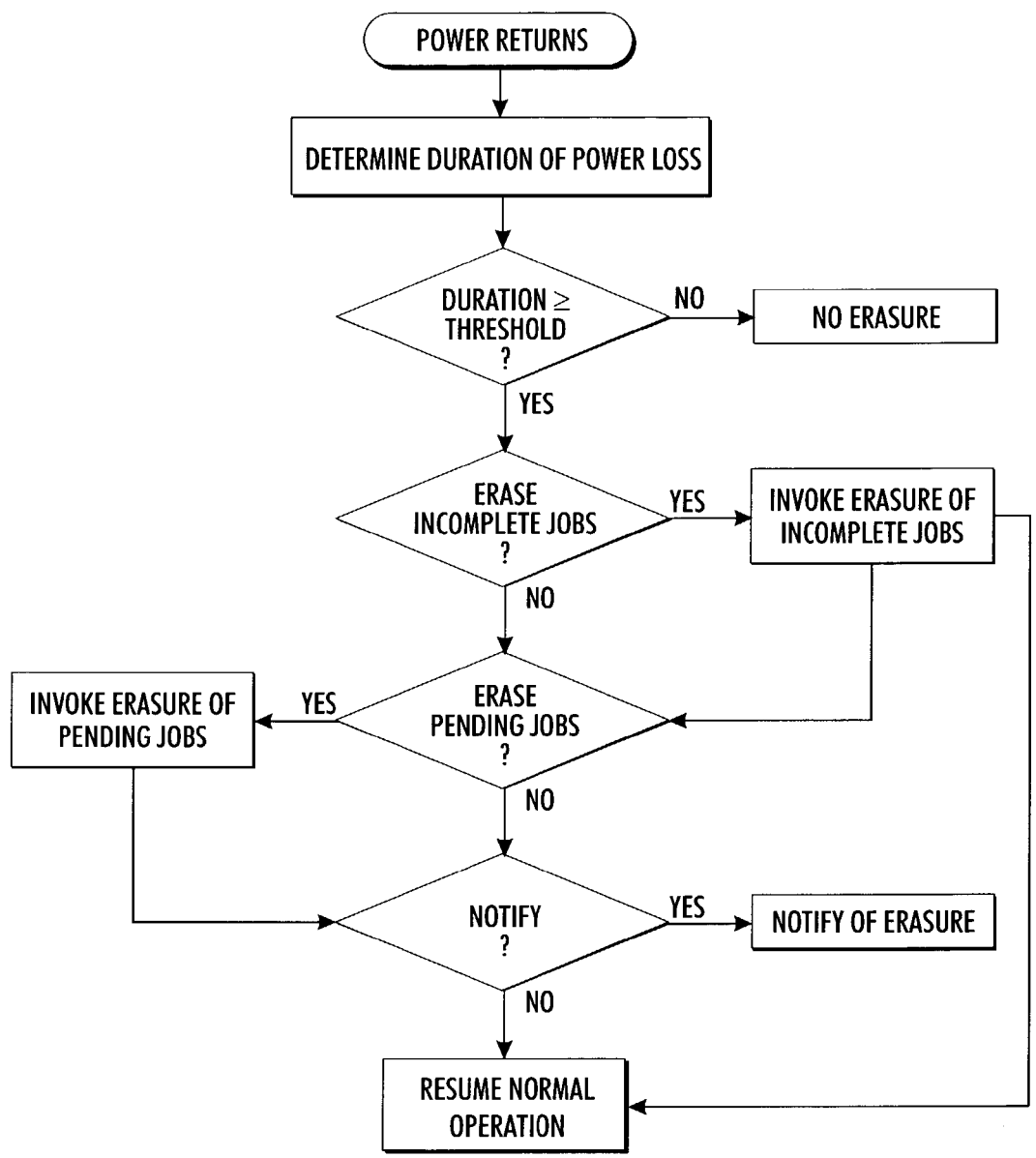
FIG. 6 is a schematic diagram illustrating a method according to additionally embodiments.

Various embodiments of the invention, as seen in FIGS. 3A–3C, can employ a timer 30 to determine how long the device 1 has been without power. Referring additionally to FIGS. 5 and 6, if the duration of power loss exceeds a reference time, then embodiments use a CPU 5 of the device 1 to invoke an erase routine to erase all pending jobs from the NVM 2.

The timer 30 can determine the duration of the power loss in a number of ways. For example, as seen in FIG. 3A, the timer 30 can be powered by a battery 31 and simply compare the time at which power returns to a time at which power was lost. Alternatively, as seen in FIG. 3B, the timer 30 could employ a chronometer 32 connected to a power source 33 of the machine 1 that starts when power is lost. Where the timer 30 compares times of day, it can access a log 35, such as an event log, and retrieve the time at which power was lost 36 and the time at which power returned 37, as schematically illustrated in FIG. 3C. The timer 30 can be powered by a battery 31, a power source 33 of the device 1, a capacitor 34, or another power appropriate power source, or any combination of these.

FIGS. 3A–3C and 4 show user interfaces that could be used according to embodiments. In FIGS. 3A–3C, a graphical user interface (GUI) 13, such as would be used with an LCD touch screen of the device 1, is shown. A GUI element 20 can be included to indicate that erasure should be performed after a power loss. Additionally, a GUI element or group of elements 21 can be included to allow indication of a threshold power loss duration. Further, a pending job GUI element 22 and an incomplete job GUI element 23 can be included to allow indication of which type(s) of job(s) should be erased when the threshold indicated in GUI element 21 is exceeded. A notification GUI element 24 can also be included to indicate that a user should be notified when erasure has occurred. As illustrated in FIGS. 3A–3C, the GUI elements 20–24 can be checkboxes, pull-down menus, or other GUI elements. Further, these elements 20–24 can be part of a set-up screen accessed only by administrators of the device 1, or can be part of a screen available to one or more categories of users of the device 1.

Figure 4:
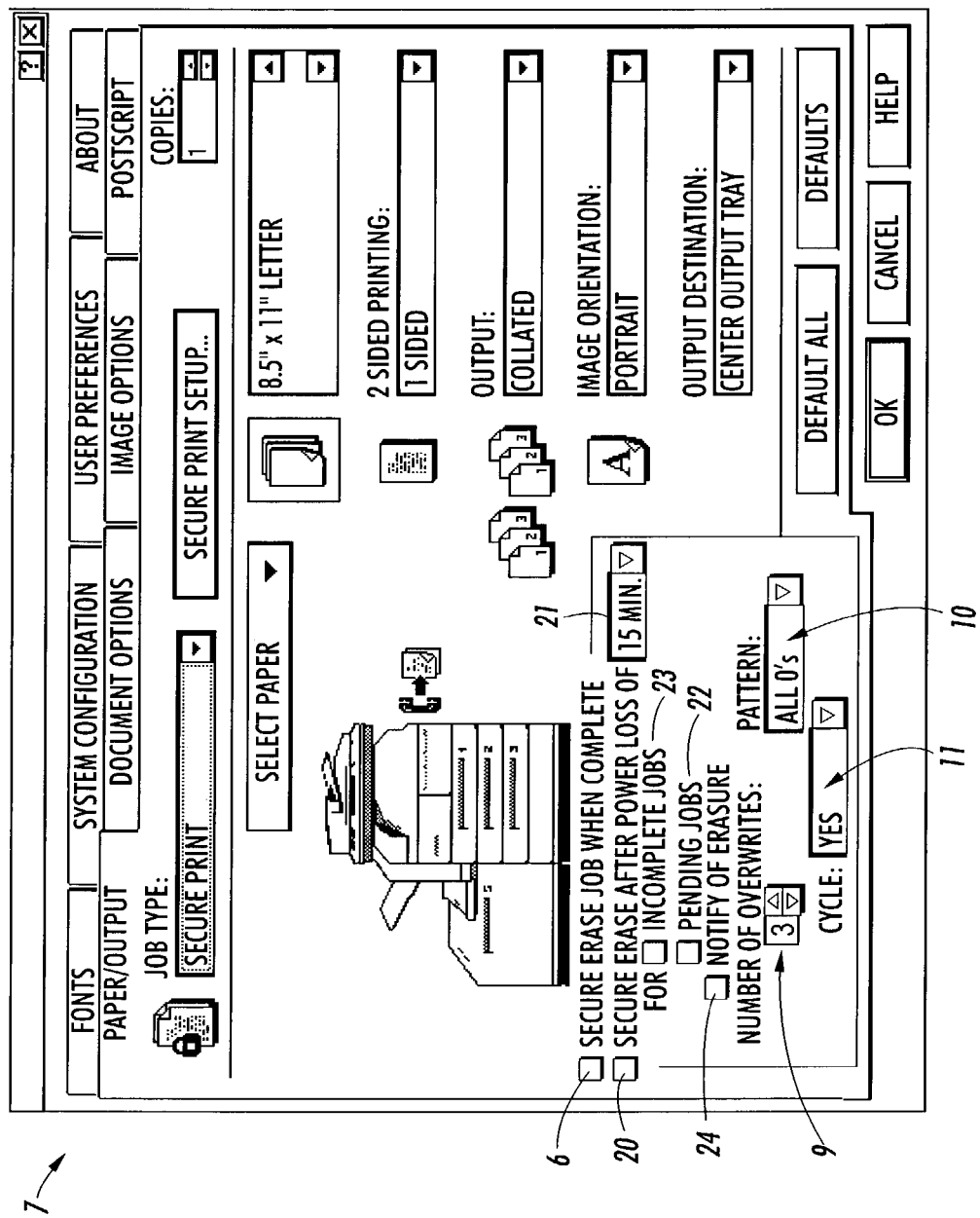
FIG. 4 is a schematic of a graphical user interface dialog box of a driver that can be implemented on a personal computer to control the device shown in FIG. 1, the dialog box allowing selection of parameters of embodiments of the invention.

FIG. 4 illustrates a print driver-type GUI 7, such as can be used in a print driver or set up application usable on a personal computer or the like. As in the device-based GUI 13, GUI elements 20–24 can be included for indication of post-power-loss erasure (element 20), threshold duration (element 21), type of job to be erased (elements 22, 23), and notification (element 24).

Examples of power loss security methods according to embodiments are shown schematically in FIGS. 5 and 6. In FIG. 5, a simple expression of a security method starts when power returns after a power loss. The duration of the power loss is determined. If the duration exceeds a reference or threshold duration, then incomplete and/or pending jobs are erased. If the duration does not exceed the threshold, incomplete and/or pending jobs are left alone to be completed.

A more complex expression of a security method, schematically illustrated in FIG. 6, also begins with a return of power after power loss. Again, the duration of the power loss is determined and compared to a threshold. If the threshold is not exceeded, then no erasure occurs, and the process ends. If the threshold is exceeded, then a check is made to see if incomplete jobs should be erased. If incomplete jobs are to be erased, then such erasure is invoked, and the method checks to see if pending jobs are to be erased; if incomplete jobs are not to be erased, the process simply continues to the pending job erasure check. If pending jobs are to be erased, then such erasure is invoked; if not, then the process simply continues without invoking erasure. Next, the process checks to see if notification of erasure has been requested, if appropriate. If requested, and appropriate, then notification is sent and the process ends. If not requested, the process simply ends.

The method illustrated in FIG. 6 could be altered within the scope of the invention. For example, erasure of incomplete jobs could be performed whenever the duration of power loss exceeded the threshold, eliminating the check, as could erasure of pending jobs. Notification could always or never be requested for incomplete or pending jobs, or both.

Figure 7:
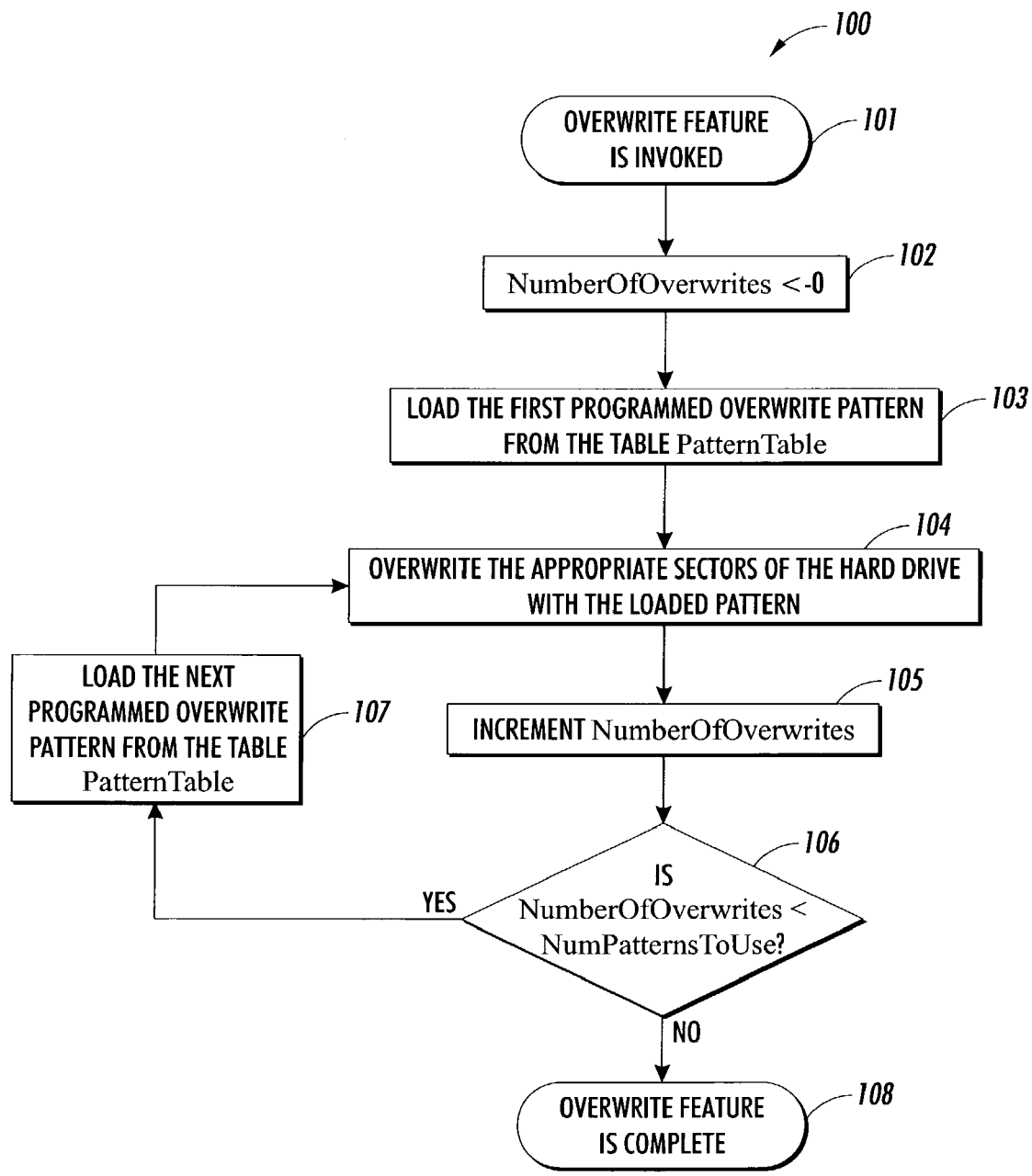
FIG. 7 is a schematic diagram illustrating an overwrite method for secure erasure usable in embodiments.
Figure 8:
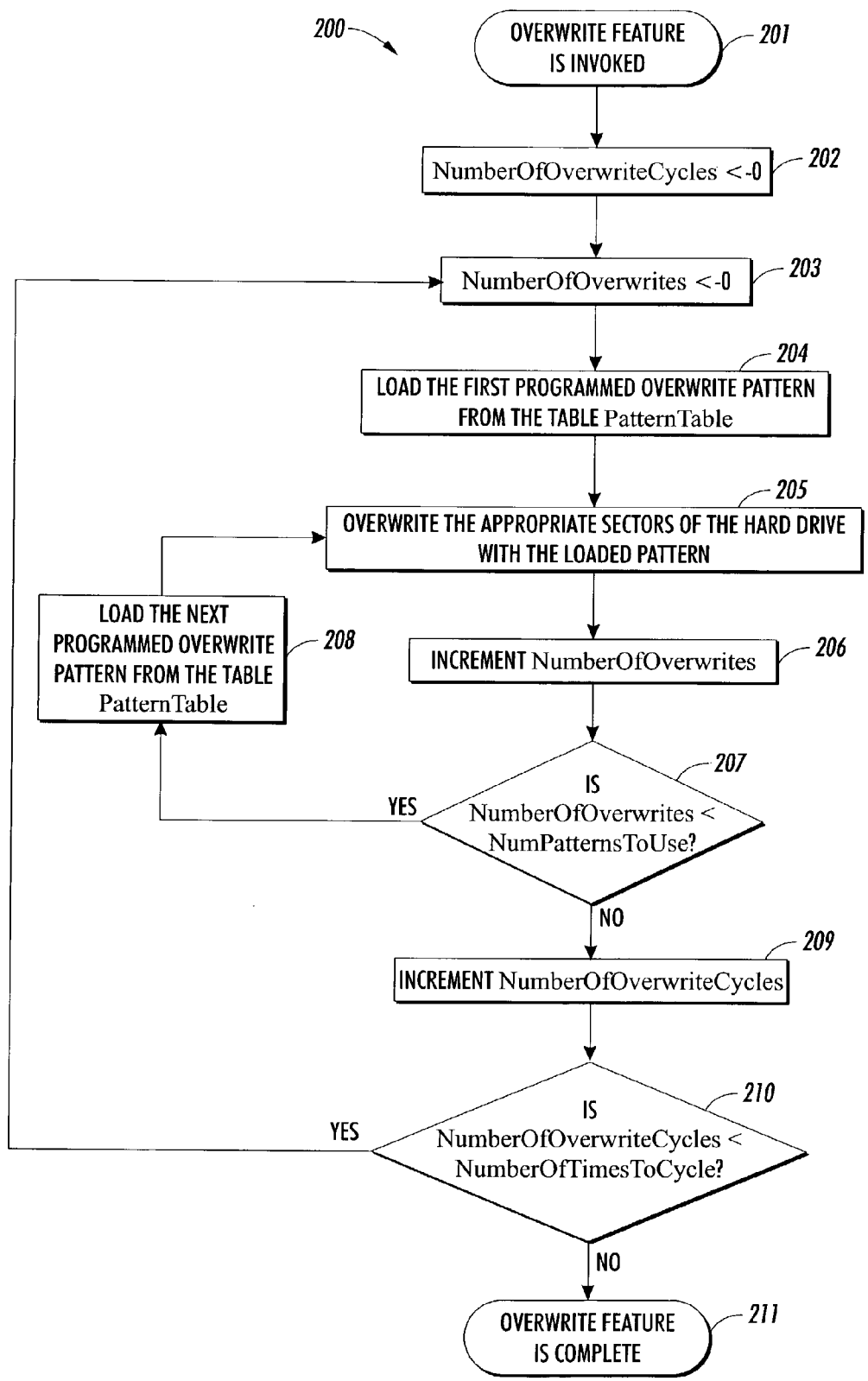
FIG. 8 is a schematic diagram illustrating another overwrite method for secure erasure usable in embodiments.

An example of an erase routine usable in embodiments is illustrated schematically in FIGS. 7 and 8. For example, the CPU 5 can provide or respond to an erase trigger 6. The erase trigger 6 in embodiments can be an instruction sent when the power loss has exceeded the reference period as discussed above. The CPU 5 stores the data file 4 in the NVM 2, which can be a fixed or removable storage medium, and keeps track of the data file 4 so that, when the erase trigger 6 is set, the erasure process can determine a location 8 of the data file on the NVM 2. The erasure process then overwrites the data file 4 according to a predetermined secure erase method; in embodiments of the invention, the secure erase method can include overwriting the data file 4 a particular number of times 9, using a particular pattern 10 to overwrite the data file 4 (such as all 1s, all 0s, etc.), and/or cycling the overwrite pattern on each iteration of the overwrite process 11. Other iteration and pattern variations can also be used.

To determine at least a number of times to overwrite the data file 4, the erasure process can check or respond to, for example, the erase trigger 6, which can include this information. Alternatively, embodiments can allow a system administrator (SA) to program the device 1 to overwrite the data file 4 according to predetermined criteria, such as a stored number of overwrites 9 and/or sequence of patterns 10 of choice. Rather than trying to settle on a single algorithm (e.g., overwrite 3 times, first time with 1s, the second time with 0s, the third time with a random pattern) for all customers, this allows selection by the SA during setup or reconfiguration of the device 1. Further, embodiments of the invention can allow the SA to program a timer that will automatically delete all data files after a specified period has elapsed.

Where more than one pattern 10 is available, a set of patterns 12 can be stored in a storage medium 2 in communication with the system. The set of patterns 12 can be stored in a computer memory or another storage medium in, for example, a table, such as a table resembling the pseudocode expression:

PatternTable (N)←Pattern1, Pattern2, Pattern3, . . .
      PatternN.

The invention can then use the set of patterns 12, the number of times to overwrite 9, and a pattern selection variable to erase the data file 4 by overwriting. For example, in embodiments of the invention, the user-selected pattern NumPatternToUse to be used and a number of times N to overwrite the data file 4 according to the pseudocode expression:

For count←1 to NumPatternToUse Do Overwrite
      region of storage media that stored the data file
      with PatternTable(count);

FIGS. 7 and 8 show two flow charts that show how embodiments of the invention might carry out the erasure process. Referring to FIG. 7, an embodiment of the process 11 using predetermined patterns from a pattern table, as well as a predetermined number of patterns to use (expressed by the variable NumPatternsToUse) is shown in flow chart 100. The erase trigger 6 is represented in the beginning block 101 of the flow chart 100 and an initial step is to set the counter NumberOfOverwrites to 0 as shown in block 102. Next, the first overwrite pattern is loaded from the pattern table, as seen in block 103. The data file 4 is overwritten using the loaded pattern as illustrated in block 104, and the NumberOfOverwrites is incremented as seen in block 105. The counter is compared to the number of patterns to use as shown in block 106. If the counter value is less than the number of patterns to use, then the next pattern is loaded as seen in block 107, and the steps shown in blocks 104–107 continue to be executed until the counter value is no longer less than the number of patterns to use, at which point the overwrite is complete, as expressed in block 108.

Referring to FIG. 8, an embodiment of the invention 11 using predetermined patterns from a pattern table, as well as a predetermined number of patterns to use (expressed by the variable NumPatternsToUse) is shown in flow chart 200 with the added feature of a number of overwrite cycles to be completed. The erase trigger 6 is represented in the beginning block 201 of the flow chart 200 and an initial step is to set the counter NumberOfOverwriteCycles to 0 as shown in block 202, then to set the counter NumberOfOverwrites to 0 as shown in block 203. Next, the first overwrite pattern is loaded from the pattern table, as seen in block 204. The data file 4 is overwritten using the loaded pattern as illustrated in block 205, and the NumberOfOverwrites is incremented as seen in block 206. The counter NumberOfOverwrites is compared to the number of patterns to use as shown in block 207. If the counter value is less than the number of patterns to use, then the next pattern is loaded as seen in block 208, and the steps shown in blocks 205–208 continue to be executed until the counter NumberOfOverwrites has a value that is no longer less than the number of patterns to use, at which point the particular overwrite is complete and the counter NumberOfOverwriteCycles incremented, as expressed in block 209. As shown in block 210, the value of the counter NumberOfOverwriteCycles is compared to a predetermined NumberOfTimesToCycle. If this counter value is less than the number of times to cycle, then the counter NumberOfOverwrites is reset, and the steps shown in blocks 203–210 continue to be executed until the counter NumberOfTimesToCycle has a value that is no longer less than the number of times to cycle, at which point the particular overwrite is complete as seen in block 211.

As should be readily apparent to one of ordinary skill in the art, the preprogrammed values of NumberOfOverwrites and NumberOfTimesToCycle, as well as the preselected patterns, of the particular processes shown in FIGS. 7 and 8 could be user selected values entered into the system using apparatus and methods such as those shown in FIGS. 3 and 4, among others.

Thus, in installations where customers wish to ensure data security, such as high security areas like military installations, customers can meet the requirement that all printed/copied jobs stored on hard drive(s) or other storage media of such devices be inaccessible once the job has completed without removing the storage medium. In addition, many customers simply want to ensure the privacy of their information and wish to erase print and/or copy jobs from storage media on which the jobs might be stored. The current conventional method of deleting a file (deleting the pointers to the data) can still be done, but the method according to embodiments of the invention ensures that data files themselves no longer reside on the disk and can not be recovered.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A job security protection method comprising:
timing a power outage experienced by a marking device;
comparing a duration of the power outage to a reference duration; and
erasing at least one incomplete job of the marking device if the duration of the power outage exceeds a reference duration.

2. The method of claim 1 wherein timing comprises determining a duration of the power outage by comparing a time at which power is restored to a time at which power ceased to be delivered to the marking device.

3. The method of claim 2 wherein timing further comprises accessing an onboard clock of the marking machine.

4. The method of claim 2 wherein timing further comprises accessing a battery-powered clock.

5. The method of claim 1 wherein timing comprises starting a chronometer when power ceases to be delivered to the marking machine.

6. The method of claim 1 performed by a controller of the marking machine.

7. The method of claim 1 further comprising erasing at least one pending job from non-volatile memory if the power loss duration exceeds the threshold duration.

8. The method of claim 7 wherein erasing includes performing a secure erase routine.

9. A job security protection method comprising:
determining a duration of a power outage experienced by a marking device;
comparing a duration of the power outage to a threshold duration; and invoking erasure of at least one incomplete job if such erasure is selected, if such jobs exist upon power return, and if the duration exceeds the threshold duration.

10. The method of claim 9 further comprising invoking erasure of at least one pending job if such erasure is selected, if such jobs exist upon power return, and if the duration exceeds the threshold duration.

11. The method of claim 9 further comprising notifying a user of erasure if erasure has occurred.

12. A job security protection apparatus including:
a timer responsive to a loss of power experienced by a marking device;
a comparator responsive to a duration of the power loss measured by the timer and a reference duration; and
a controller that erases at least one job of the marking device if the duration of the power loss exceeds the reference duration.

13. The apparatus of claim 12 wherein the timer determines the duration of the power loss by comparing a time at which power is restored to a time at which power ceased to be delivered to the marking device.

14. The apparatus of claim 13 wherein the timer is connected to an onboard clock of the marking machine.

15. The apparatus of claim 13 wherein the timer is connected to a battery-powered clock.

16. The apparatus of claim 12 wherein the timer includes a chronometer that starts when power ceases to be delivered to the marking machine.

17. The apparatus of claim 12 further comprising a secure erase device that erases the at least one job from non-volatile memory.

18. The apparatus of claim 12 wherein the at least one job is at least one of an incomplete job and a pending job.

19. A post-power-loss job security apparatus comprising:
a power loss erasure GUI element;
a threshold duration GUI element, the power loss erasure GUI element selectively indicating that erasure of jobs should occur when power returns to a marking device after a power loss exceeding a threshold duration indicated by the at least one threshold duration GUI element; and
at least one job type GUI element selectively indicating at least one type of job to be erased when the power loss duration exceeds the threshold duration.

20. The apparatus of claim 19 wherein the at least one job type GUI element includes an incomplete job GUI element.

21. The apparatus of claim 19 wherein the at least one job type GUI element includes an pending job GUI element.

22. The apparatus of claim 19 further comprising a notification GUI element selectively indicating that a user should be notified when erasure occurs.

23. The apparatus of claim 19 wherein the GUI elements are displayed as part of a marking device on-board GUI.

24. The apparatus of claim 19 wherein the GUI elements are displayed as part of a marking device driver GUI.

25. The apparatus of claim 19 wherein the GUI elements are displayed as part of a marking device set-up GUI.

* * * * *